May 2, 1950   C P OVERMYER, JR   2,506,236
MACHINE STOP-CHECK FOR JAM-PROOFING DIAL INDICATORS
Filed Dec. 5, 1947

C P Overmyer, Jr.
INVENTOR.

BY Clarence A. O'Brien
and Harvey B. Jacobson
Attorneys

Patented May 2, 1950

2,506,236

UNITED STATES PATENT OFFICE 2,506,236

MACHINE STOP-CHECK FOR JAM-PROOFING DIAL INDICATORS

C P Overmyer, Jr., Winchester, Ind., assignor to Overmyer Mould Co., Winchester, Ind., a corporation of Indiana Application December 5, 1947, Serial No. 789,915

3 Claims. (Cl. 33—172)

The present invention relates to a novel and improved attachment for work cutting and boring machines of types which employ dial gauges and indicators and has more particular reference to a stop-check which is interposed between a moving stop on the machine carriage and the plunger of the dial indicator in a manner to prevent the stop from forcibly jamming and breaking the internal parts of the indicator.

It is a matter of common knowledge that where accuracy in work results is essential, a dial indicator is employed so that when the moving stop on the tool carriage contacts the stem or plunger of the indicator and a predetermined reading on the latter is had, the machine must be immediately stopped. However, careless machine operators are not alert and when they fail to stop the machine when the stop comes into actuating relation with the dial indicator, the stop goes beyond a point of safety, forcibly jams against the indicator and breaks and renders the latter out of order. With such conditions in mind I have evolved and produced a novel stop-check which is interposed between the stem of the indicator and the oncoming machine stop, whereby the stop is not permitted to travel to a point which would crash and demolish the indicator.

Another object of the invention is to provide a stop-check for jam proofing dial indicators which is readily attachable to all types of machines now in use in this line of endeavor, the same being simple, economical, practical and also serving as a convenient mount for the coacting dial indicator.

Other objects and advantages will become more readily apparent from the following description in the accompanying illustrative drawings.

Figure 1:
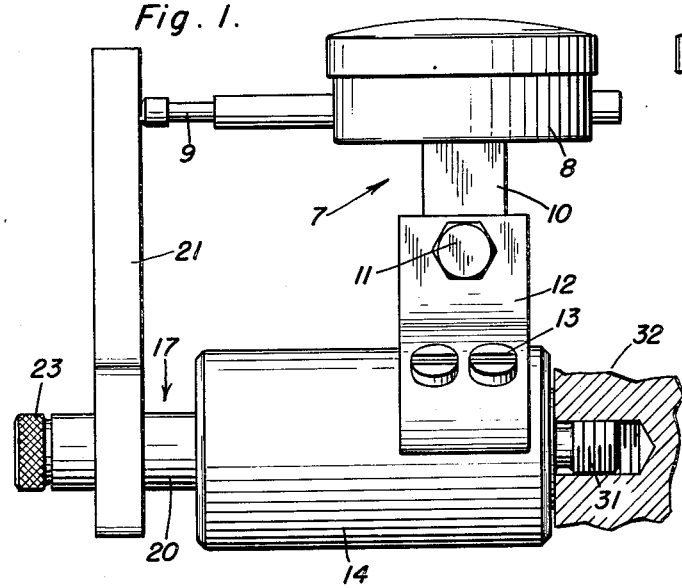
Figure 1 is a side elevational view showing the fragmentary portion of the frame of the machine and illustrating the conventional style indicator and my improved safety-type stop check readied to operate the stem of the indicator.
Figure 2:
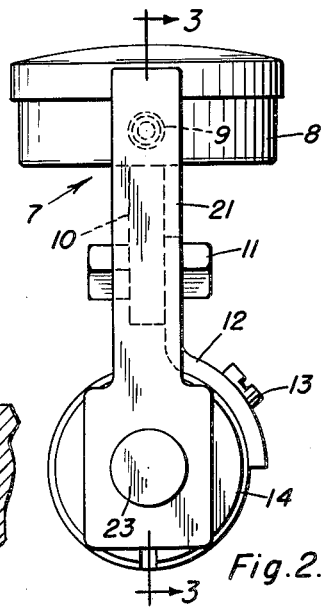
Figure 2 is an elevational view of Figure 1 observing the same in the direction from left to right.
Figure 3:
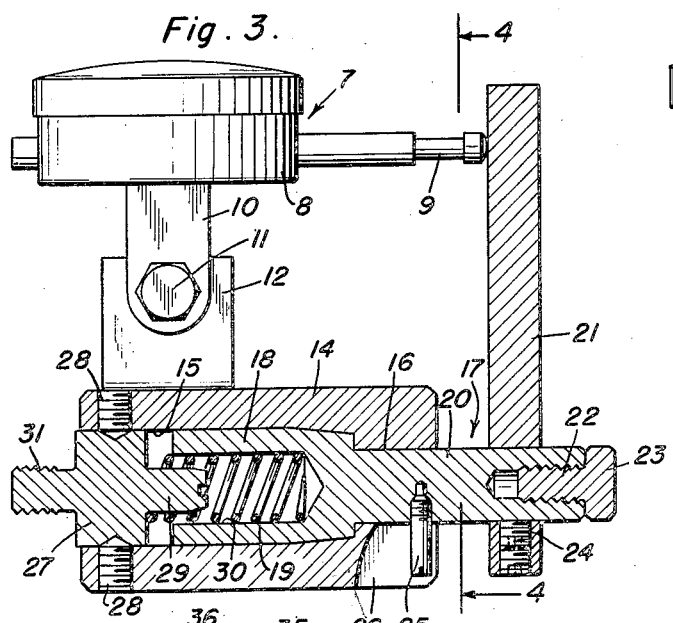
Figure 3 is a view in section and elevation on the line 3—3 of Figure 2, looking in the direction of the arrows.
Figure 4:
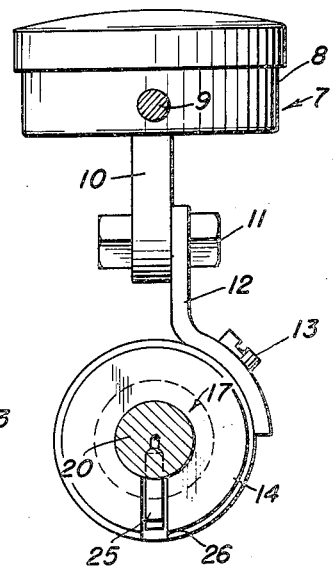
Figure 4 is a vertical section of line 4—4 of Figure 3, looking in the direction of the arrows.

Reference is had first to Figure 3 wherein will be seen the conventional type dial indicator or gauge denoted by the numeral 7, the same having the usual casing 8, and reciprocatory stem or plunger 9 for operating the hand (not shown) of the dial of the indicator. The bracket 10 of the indicator is bolted or otherwise fastened as at 11 to an adapter fixture 12 which is in turn bolted or otherwise secured as at 13, to the main part of the novel stop-check. The latter comprises a horizontal cylinder 14 having a socket 15 and a guide bore 16. The numeral 17 designates a plunger having a socketed head 18 mounted for limited reciprocation in the chamber 15, the socket serving to partially house a coiled return spring 19. The stem 20 is slidable through the guide bore and carries a perpendicular post 21 which actuates the indicator stem 9. The stem 20 has a check-screw the shank portion 22 of which is adjustably threaded into a socket and the head of which is knurled, the head being denoted by the numeral 23. Not only is the check-screw 23 adjustable, but the stem actuator post 21 is also adjustable on the stem 20, the adjusting nuts being denoted at 24 in Figure 3. The stem 20 carries a guide 25 which is operable in a guide notch 26 provided in the barrel or cylinder 14. A plug 27 is fitted into the outer otherwise open end of the socket 15 and secured in place by set-screws 28. The plug has a stud 29 on its interior which projects into the spring socket 30. Exteriorly the plug is provided with a screw-threaded attaching shank 31 which is threaded into a socket provided therefor in the machine frame 32 as brought out in Figure 1.

Figure 5:
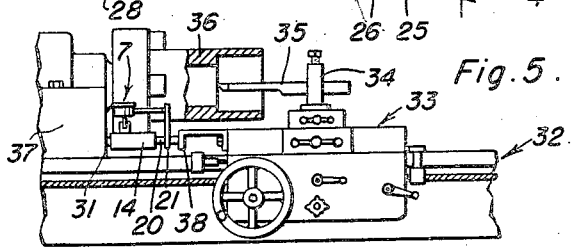
Figure 5 is a view in section and elevation, on a small scale, showing parts of the machine, with the invention in place, to bring out the arrangement and functioning of the latter.

In Figure 5 the carriage of the machine is denoted at 33, the tool post 34 and the cutting tool 35. The work is denoted by the numeral 36 and the source of power is indicated, generally, at 37. The stop on the carriage is denoted by the numeral 38. Normally this part 38 comes into pressure contact with the stem 9 of the dial indicator 7. Under the present arrangement the invention is interposed between said stem 9 and the stop 38 as illustrated, on a small scale but sufficiently, in Figure 5.

In operation the machine stop 38 moves into pressure contact with the check-stop-screw 23 and slides the plunger of the safety device in a direction from right to left in Figure 3. The post 21 is in contact with the receding stem 9 for purposes of operating the pointer or hand on the dial. As the plunger is thus pressed, the spring 19 is compressed and when the head of the plunger comes into contact with the plug 27, the stroke of said plunger 17 is checked. Obviously, the machine carriage may travel only the distance that exists between the plunger 17 and plug 27. This distance is figured and predetermined according to the total travel of the indicators stem, that is, the travel is .250 on the indicator, the distance between the plunger and the plug would be something less so that the plunger will contact the plug and stop before the indicator stem has gone its full stroke, thereby checking the travel of the stop 38 and preventing the dial indicator from being smashed. It follows, therefore, that the stop check conveniently jam-proofs the dial indicator. Appropriate adjustment may be made in the device to insure proper coordination between the traveling stop on the machine and the relatively fixed dial indicator.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials or rearrangement of parts may be resorted to in actual practice so long as no departure is made from the invention as claimed.

Having described the invention, what is claimed as new is:

1. A safety type carriage stop for jam-proofing a conventional type dial indicator used, for example, on a work cutting and boring machine of the type wherein a tool carriage is mounted for reciprocation on a relatively stationary frame; comprising a cylinder, adapter means removably mounted in one end of said cylinder, said adapter means being exteriorly provided with a screw-threaded attaching shank serving to mount the cylinder on the stated frame, a plunger having a head reciprocable in said cylinder and a stem slidable through and beyond one end of said cylinder, a coiled spring mounted in said head and bearing at one end against said adapter, a dial indicator fixedly supported on said cylinder and having an extensible and retractible dial actuating stem, said stem being spaced from and substantially parallel to the stem of said plunger, and a post removably mounted on and at right angles to the stem of said plunger and having one end portion in constant contact with the adjacent end portion of the stem of said dial indicator.

2. A safety type carriage stop for jam-proofing a conventional type dial indicator such as is commonly used on a work cutting and boring machine of the type wherein a tool carriage is mounted for reciprocation on a relatively stationary frame; comprising a horizontal cylinder having a stem opening at one end and being wholly open at an opposite end, a plunger having a head slidable in said cylinder and a stem operable and through beyond the stem opening in said cylinder, said head being provided with a spring accommodating socket, a coiled spring mounted in said socket, a plug removably secured in the open end of said cylinder, said plug being provided on its inner side with a concentric stud in axial alignment with said socket, a coiled spring mounted in said socket and surrounding the stud and bearing against said adapter, said coiled spring serving to normally space said head from said adapter, the latter functioning as a stop and limiting the movement of the head in the direction towards said plug, the outer end of said plug being provided with a screw-threaded shank which is adapted to be mounted in a screw-threaded socket provided therefor in the aforementioned frame, the outer end of the plunger stem being provided with an axial socket which is internally screw-threaded, a set screw having a shank screwed into said screw-threaded socket, a post at right angles to said stem, said post being apertured and fitted removably over said stem, and the apertured portion of said post being provided with a set screw engaging said stem for mounting the post removably and adjustably on said stem.

3. A safety type carriage stop for jam-proofing a conventional type dial indicator such as is commonly used on a work cutting and boring machine of the type wherein a tool carriage is mounted for reciprocation on a relatively stationary frame; comprising a horizontal cylinder having a stem opening at one end and being wholly open at an opposite end, a plunger having a head slidable in said cylinder and a stem operable and through beyond the stem opening in said cylinder, said head being provided with a spring accommodating socket, a coiled spring mounted in said socket, a plug removably secured in the open end of said cylinder, said plug being provided on its inner side with a concentric stud in axial alignment with said socket, a coiled spring mounted in said socket and surrounding the stud and bearing against said adapter, said coiled spring serving to normally space said head from said adapter, the latter functioning as a stop which limits the movement of the head in the direction towards said plug, the outer end of said plug being provided with a screw-threaded shank which is adapted to be mounted in a screw-threaded socket provided therefor in the aforementioned frame, the outer end of the plunger stem being provided with an axial socket which is internally screw-threaded, a set screw having a shank screwed into said screw-threaded socket, a post at right angles to said stem, said post being apertured and fitted removably over said stem, and the apertured portion of said post being provided with a set screw engaging said stem for mounting the post removably and adjustably on said stem together with a fixture securely mounted on said cylinder, a dial indicator mounted on said fixture, said dial indicator including an extensible and retractible dial actuating stem disposed in substantial parallelism with the first named stem and in constant contact at its outer end with an adjacent end portion of said post.

C P OVERMYER, Jr.

REFERENCES CITED

The following references are of record in the file of this patent:

UNITED STATES PATENTS

| Number | Name | Date |
|---|---|---|
| 693,744 | Sears | Feb. 18, 1902 |
| 1,340,811 | Ballman | May 18, 1920 |
| 1,639,494 | Flanders | Aug. 16, 1927 |
| 2,078,352 | Summers | Apr. 27, 1937 |
| 2,105,703 | Self | Jan. 18, 1938 |
| 2,165,017 | Sisson | July 4, 1939 |
| 2,181,077 | Street | Nov. 21, 1939 |
| 2,455,592 | Lively | Dec. 7, 1948 |

FOREIGN PATENTS

| Number | Country | Date |
|---|---|---|
| 85,267 | Sweden | Nov. 14, 1935 |